H. M. SMITH.
WELDING APPARATUS.
APPLICATION FILED SEPT. 30, 1918.

1,350,572.

Patented Aug. 24, 1920.
2 SHEETS—SHEET 1.

INVENTOR
Herbert M. Smith
BY
Frank J. Kent
ATTORNEY

UNITED STATES PATENT OFFICE.

HERBERT M. SMITH, OF GREAT BARRINGTON, MASSACHUSETTS, ASSIGNOR TO STANLEY INSULATING COMPANY, OF GREAT BARRINGTON, MASSACHUSETTS, A CORPORATION OF MAINE.

WELDING APPARATUS.

1,350,572.   Specification of Letters Patent.   Patented Aug. 24, 1920.

Application filed September 30, 1918. Serial No. 256,284.

*To all whom it may concern:*

Be it known that I, HERBERT MILLS SMITH, a citizen of the United States, residing at Great Barrington, in the county of Berkshire and State of Massachusetts, have invented certain new and useful Improvements in Welding Apparatus, of which the following is a specification.

This invention relates to electric welding apparatus particularly such as is adapted to accomplish line welding of tubes or the like. One of the objects of the invention is to provide apparatus of this kind in which provision is made for automatically breaking the circuit of the welding current upon the completion of the weld and also to accomplish automatically the stopping of movement of the traveling parts which carry the work through the welding field.

Another object is to arrange for the water cooling of the electrodes between which the welding of the article is accomplished and also to arrange for flowing water over the work directly at the weld while the welding is going on.

Still another object is to provide for transmission of the welding current from the transformer to the traveling electrode which carries the work, involving an expansible conductor.

Still another object is to provide a mounting of the stationary roller electrode whereby adjustment may be made of the pressure of the roller electrode against the work.

Other objects of the invention more or less broad than those referred to will be in part obvious and in part specifically referred to in the course of the following description of the elements, combinations, and arrangements of parts going to make up the invention; and the scope of protection which I contemplate will appear from the claims.

Figure 1:
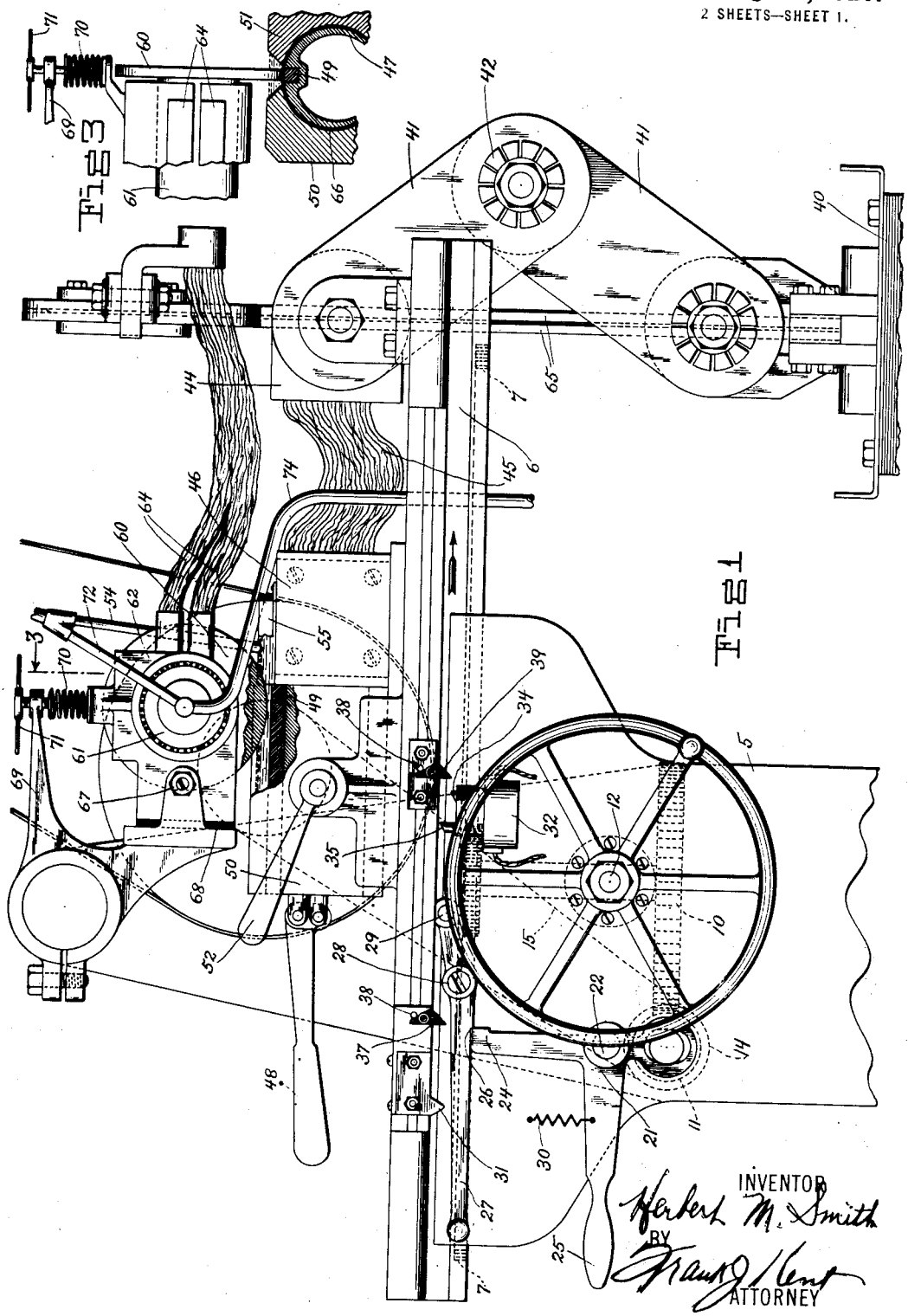
Figure 2:
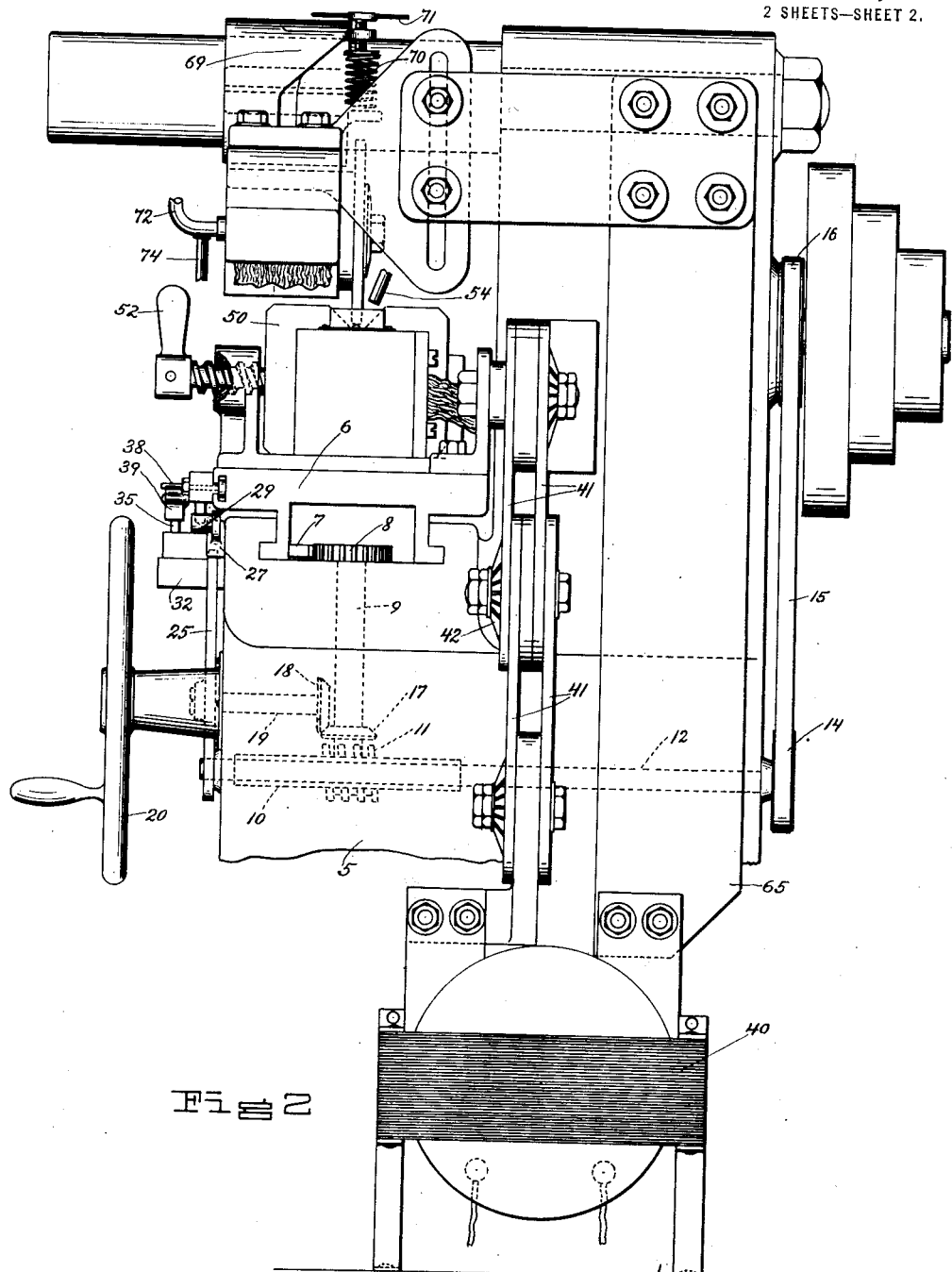

In the accompanying drawings which are to be taken as a part of this specification, and in which I have shown a merely preferred form of embodiment of the invention, Figure 1 is an elevation with parts in section of a welding machine embodying my invention; Fig. 2 is an end view of the same looking from right to left of Fig. 1; Fig. 3 is a detail in section substantially on the line 3—3 of Fig. 1.

Referring to the numerals on the drawings, there is shown at 5 a machine frame in which is mounted for line movement in opposite directions a table 6. This table 6 is provided along one edge with a rack 7, the ends of which are shown in Fig. 1. Coöperating with this rack to move the table longitudinally there is a pinion 8, mounted on a shaft 9, which shaft is driven by means of a worm gear 10 engaging with a worm 11 carried on a shaft 12 which is driven by means of a pulley 14 through belt 15 which passes over a main driving pulley 16. Thus upon operation of the driving pulley 16 the table will be caused to move longitudinally in the direction of the arrow of Fig. 1. For accomplishing such movement by hand when desired there is provided on the shaft 9 a beveled gear 17 which meshes with a gear 18 carried on shaft 19 operated by hand wheel 20. All the parts thus far described are suitably mounted in the machine frame and properly coördinated for the accomplishment of the desired movements. The shaft 12 which carries the worm 11 to operate the worm gear 10 is engaged by one end of the lever 21, this lever being fulcrumed at 22 and having an upward extension 24 and an operating handle 25. When the lever is in the Fig. 1 position the worm 11 is in engagement with the gear 10. The lever is normally held in this position by the engagement of the end of its upward extension 24 with a latch socket 26 formed in the long arm 27 of a bell crank lever fulcrumed at 28 in the machine frame and having a short arm 29. If the short arm 29 be depressed, thus throwing the long arm upwardly, the end 24 of the lever 21 will be released from its engagement with the latch socket 26 and will move to the right under the influence of the coiled spring 30, this same movement resulting in a movement of the lower end of the lever 21 to the left, flexing the worm shaft 12 sufficiently to throw the worm out of engagement with the worm gear 10, whereupon obviously the movement of the table 6 will be stopped. The operation of the bell crank lever 27 is controlled by means of a finger 31 which is adjustably mounted at a selected point along the side of the table so that as the table travels to the right of Fig. 1 this finger 31 will come in contact with the end 29 of the bell crank lever, depressing the same, with the consequences above stated. So much for the automatic control of the power-actuated means for causing movement of the table.

The making and breaking of the welding circuit is controlled by means of a double-acting switch 32 adjustably mounted at a suitable place on the machine frame and having two spring-pressed buttons 34 and 35 arranged and related so that when one of them is depressed the other automatically rises, and when one of them is up and the other down the circuit is open and in the vice versa relation the circuit is closed. As shown in Fig. 1 the left hand button is up and the right hand button down and the welding current is now on. As the table travels to the right the left hand button 35 is struck by a pivoted dog 37, adjustably mounted on the table provided with a stop pin 38 so disposed that the lower end of the dog 37 cannot move to the left though it is free to move to the right. The result of this contact is that the dog causes depression of the button 35, the button and the dog being correspondingly beveled to facilitate this action. This depression of the button 35 results in a breaking of the welding circuit and takes place at a moment which corresponds with the completion of the weld, though the movement of the table still continues until the finger 31 operates the bell crank lever as before described. The work is now removed from the work holder, a fresh piece of work is inserted, and the table returned to starting position by operation of the hand wheel 20 in an obvious manner. At the same time the worm 11 is restored to its engagement with the worm gear 10 by manual operation of the handle 25, the long end 27 of the bell crank lever dropping by gravity into locking position over the end 24 of the lever 21 whereby the worm is held in its driving engagement with the worm gear. At the moment when the mechanical movement of the table was automatically stopped the dog 37 was in position between the two buttons 34 and 35 and the button 34 was up and the button 35 down. On the return movement of the table the dog 37 passes over the depressed button 35, and the button 34 which is up is met by a second dog 39 similar to the dog 37 and similarly adjustably mounted on the table. This contact does not result in depression of the button 34 because the lower end of the dog is free to move to the right allowing the extended button 34 to pass freely under it. With the dogs and the buttons in this position the automatic movement of the table begins upon manipulation of the handle 25 as before described, to throw the worm 11 into engagement with the worm gear 10. As the table now begins to move to the right the dog 39 again meets the extended button 34 and this time, because of the stop pin 38, the button 34 is depressed by the dog which results in the closing of the welding circuit.

The transformer is indicated at 40 and the circuit from the transformer includes the conductor made of copper links 41 pivotally connected together and held in frictional contact by means of copper washers 42. The upper one of these links 41 is connected to a copper block 44 supported on the table 6 and from this copper block 44 extend wires 45 leading to a copper block 46 which is in electrical connection with a work holder shown in detail in Figs. 1 and 3. This work holder comprises an extensible and contractible mandrel 47 whose expanding and contracting movements are controlled by a lever 48, the details of the connections not being shown. This mandrel 47 carries a copper bar 49 which constitutes one of the welding electrodes. 50, 51 indicate outside clamps for holding the work against the mandrel, one of these clamps being preferably stationary and the other movable, and the movement of the movable clamp controlled by means of a lever 52. The clamp blocks 50, 51, are beveled adjacent their upper meeting edges, so that with a piece of work in place above the copper bar 49 there is formed a channel for water, which may be introduced through a supply pipe 54, a retaining wall 55 being provided at the rear of the block 46 to prevent escape of the water in that direction. It will be understood that the work holder thus described is securely held on the table 6 and travels with it, the link connections 41 permitting of reasonable variation in the distance between the transformer and the work holder. Coöperating with the work holder is a roller or wheel electrode indicated at 60 carried on the end of a rotor 61 which rotates in a casting 62 electrically connected by means of wires 64 and copper bars 65 with the other side of the transformer. This wheel electrode 60 extends down into the channel of the work holder above the copper bar 49 so that as current passes between the copper bar 49 and the wheel electrode 60 a piece of work, indicated at 66 in Fig. 3, may be welded, the friction of the work against the wheel 60 causing the latter to rotate. The casting 62 which carries the wheel electrode is pivoted at 67 to the machine frame and suitably insulated therefrom as indicated at 68. A bracket 69 extending from the machine frame over the casting 62 carries a compression spring 70 operated by a wheel 71 whereby the casting 62 may be rocked on its pivot, compressing the insulation 68, to cause the wheel to bear downwardly against the work with more or less pressure as desired. The rotor 61 is internally water cooled, a branch water supply pipe 72 being provided for that purpose, and the outlet pipe for the cooling water is indicated at 74.

I claim:—

1. In a device of the kind described a stationary electrode and a traveling electrode, the traveling electrode constituting a work holder, power-actuated means for moving the traveling electrode and automatically operating means for stopping the movement of the traveling electrode at a predetermined point in its travel.

2. In a device of the kind described a stationary electrode and a traveling electrode, circuit connections to the electrodes for supplying welding current, power-driven means for moving the traveling electrode, automatically operative means for stopping the movement of the traveling electrode, and automatically operative means for breaking the welding circuit upon the stopping of movement of the traveling electrode.

3. In a device of the kind described, electrical connections from the transformer to the stationary electrode, and electrical connections from the transformer to the traveling electrode including pivotally connected links of conductive material.

4. In a device of the kind described a stationary electrode and a traveling electrode and welding circuit connections therefor, power means for causing movement of the traveling electrode from an initial position to begin welding to a final position at which welding is completed, operative means for stopping the movement of the traveling electrode, automatically operative means for breaking the welding circuit when the movement of the traveling electrode is stopped, means for moving the traveling electrode to first position, and means automatically operative upon the movement of the traveling electrode to first position for closing the welding circuit.

5. In a device of the kind described a stationary rotating electrode and a traveling electrode, the traveling electrode constituting the workholder, means for mounting the stationary rotating electrode so that it will have a variably determined pressure against the work on the traveling electrode, power-actuated means for moving the traveling electrode, and automatically operating means for stopping the movement of the traveling electrode at a variably predetermined point in its travel.

6. In a device of the kind described a stationary electrode and a traveling electrode, the traveling electrode constituting a workholder, power-actuated and hand-operated means for moving the traveling electrode, optionally operable, and automatically operating means for stopping the movement of the traveling electrode at a variably predetermined point in its travel.

7. In a device of the kind described a stationary electrode and a traveling electrode, the traveling electrode constituting a workholder, power-actuated and hand-operated means for moving the traveling electrode, optionally operable, automatically operating means for stopping the movement of the traveling electrode at a variably predetermined point in its travel, and automatically operating means for opening and closing the welding circuit at variably predetermined times.

In testimony whereof I affix my signature.

HERBERT M. SMITH.